(12) United States Patent
Ishikawa et al.

(10) Patent No.: US 8,964,149 B2
(45) Date of Patent: Feb. 24, 2015

(54) LIQUID CRYSTAL DISPLAY DEVICE AND METHOD FOR MANUFACTURING TRANSPARENT ELECTRODE

(75) Inventors: Hiroyuki Ishikawa, Yao (JP); Mitsuo Moriya, Yao (JP); Mitsuru Takigawa, Yao (JP)

(73) Assignee: Hosiden Corporation, Yao-shi (JP)

( * ) Notice: Subject to any disclaimer, the term of this patent is extended or adjusted under 35 U.S.C. 154(b) by 354 days.

(21) Appl. No.: 13/262,394

(22) PCT Filed: Apr. 1, 2010

(86) PCT No.: PCT/JP2010/056026
§ 371 (c)(1),
(2), (4) Date: Sep. 30, 2011

(87) PCT Pub. No.: WO2010/134386
PCT Pub. Date: Nov. 25, 2010

(65) Prior Publication Data
US 2012/0019749 A1    Jan. 26, 2012

(30) Foreign Application Priority Data

May 22, 2009  (JP) .................................. 2009-123843

(51) Int. Cl.
*G02F 1/1333* (2006.01)
*G02F 1/1343* (2006.01)
*G02F 1/1335* (2006.01)

(52) U.S. Cl.
CPC ...... *G02F 1/13439* (2013.01); *G02F 1/133512* (2013.01); *G02F 1/134336* (2013.01)
USPC .......................................... 349/110; 349/139

(58) Field of Classification Search
CPC .................... G02F 1/133512; G02F 1/134336; G02F 1/13439; G02F 1/136209; G02F 1/0316; G02F 1/133707; G02F 1/133553; G02F 1/1343

USPC ................................................... 349/110, 139
See application file for complete search history.

(56) References Cited

U.S. PATENT DOCUMENTS 6,268,895 B1 *  7/2001  Shimada et al. .............. 349/110
6,330,047 B1 * 12/2001  Kubo et al. .................... 349/147
(Continued)

FOREIGN PATENT DOCUMENTS

JP          8-194215         7/1996
JP          2005-62472       3/2005

*Primary Examiner* — Kaveh Kianni
(74) *Attorney, Agent, or Firm* — Rankin, Hill & Clark LLP

(57) ABSTRACT

A liquid crystal display apparatus is provided in which light leakage from a peripheral portion of a non-selected pixel can be suppressed without reducing the aperture ratio of each pixel, and the contrast can be improved. A liquid crystal display apparatus 1 includes: first and second transparent substrates 5*a* and 5*b* which are opposed to each other to be placed through a predetermined gap; a liquid crystal layer 8 which is placed between opposed surfaces of the first and second transparent substrates 5*a* and 5*b*; first strip-like transparent electrodes 3*a* which are formed in a stripe-like pattern on a surface of the first transparent substrate 5*a* that is opposed to the second transparent substrate 5*b*; a transparent resin film 22 which is a transparent resin covering film that is formed after a stripe-like black mask 21 is formed in a direction perpendicular to the first strip-like transparent electrodes 3*a*, on a surface of the second transparent substrate 5*b* that is opposed to the first transparent substrate 5*a*, the resin film having inverted trapezoidal recessed portions 22*a* in the film surface corresponding to gaps of the black mask 21; and second strip-like transparent electrodes 30*b* which are formed in the recessed portions 22*a* of the resin film 22, and which have an inverted trapezoidal shape.

7 Claims, 6 Drawing Sheets

(56) References Cited

U.S. PATENT DOCUMENTS

| | | | |
|---|---|---|---|
| 6,633,356 B1 * | 10/2003 | Kataoka et al. | 349/129 |
| 6,801,293 B1 * | 10/2004 | Nishiyama et al. | 349/187 |
| 6,912,033 B2 * | 6/2005 | Ashizawa et al. | 349/141 |
| 8,174,664 B2 * | 5/2012 | Niiya | 349/155 |
| 2001/0000437 A1 * | 4/2001 | Tanaka et al. | 349/110 |
| 2007/0026324 A1 * | 2/2007 | Yoshida et al. | 430/7 |

* cited by examiner

LIQUID CRYSTAL DISPLAY DEVICE AND METHOD FOR MANUFACTURING TRANSPARENT ELECTRODE

TECHNICAL FIELD

The present invention relates to a liquid crystal display apparatus having a simple matrix type electrode structure, and also to a method of producing transparent electrodes.

BACKGROUND ART

FIG. 2 is a sectional view of a vertically aligned liquid crystal display apparatus showing an example of a liquid crystal display apparatus having a simple matrix type electrode structure. The vertically aligned liquid crystal display apparatus 1 includes a liquid crystal panel 2, and displays an image by using the liquid crystal panel 2.

In the liquid crystal panel 2, a first transparent substrate 5a configured by a glass plate or the like in which first strip-like transparent electrodes 3a made of ITO (Indium Tin Oxide) or the like are formed on one substrate surface, a first alignment film 4a is formed on the first strip-like transparent electrodes 3a, and a rubbing process is performed on the first alignment film 4a, and a second transparent substrate 5b configured by a glass plate or the like in which second strip-like transparent electrodes 3b made of ITO or the like are formed on one substrate surface, a second alignment film 4b is formed on the second strip-like transparent electrodes 3b, and a rubbing process is performed on the second alignment film 4b are bonded together so that the first alignment film 4a and the second alignment film 4b are opposed to each other, while using, for example, polymer spheres 6 as a spacer material, and the periphery is sealed by a frame-like seal 7, whereby a panel body 2a is formed. In the case of the liquid crystal panel 2, the first transparent substrate 5a which is in the lower side is configured as a rear substrate 5a on the side of a backlight (light source), and the second transparent substrate 5b which is in the upper side is configured as a front substrate 5b on the side of a display screen, thereby configuring a transmission type one.

In a gap (cell gap) between the first transparent substrate 5a and the second transparent substrate 5b, furthermore, a liquid crystal is encapsulated by the vacuum injection method, the dripping method, or the like, so that a liquid crystal layer 8 is formed. In the case of the liquid crystal panel 2, a nematic liquid crystal (negative liquid crystal) having a negative dielectric constant anisotropy is used as the liquid crystal, thereby forming a vertically aligned one.

Moreover, a first polarizing plate 9a is applied to the substrate surface of the first transparent substrate 5a opposite to the side which is in contact with the liquid crystal layer 8, and a second polarizing plate 9b is applied to the substrate surface of the second transparent substrate 5b opposite to the side which is in contact with the liquid crystal layer 8, thereby completing the liquid crystal panel 2.

FIG. 3 is a view showing an electrode structure of simple matrix driving in the vertically aligned liquid crystal display apparatus. In the first and second strip-like transparent electrodes 3a and 3b, for example, the first strip-like transparent electrodes 3a which are in the lower side are formed in parallel in a plural number in a lateral direction (horizontal direction) to be formed as a whole as a lateral stripe pattern to be configured as scanning electrodes that are connected to a scan driving circuit 10, and the second strip-like transparent electrodes 3b which are in the upper side are formed in parallel in a plural number in a longitudinal direction (vertical direction) to be formed on the whole as a longitudinal stripe pattern to be configured as signal electrodes that are connected to a signal driving circuit 11. The first and second strip-like transparent electrodes 3a and 3b constitute the simple matrix type electrode structure. In the liquid crystal panel 2, each of intersections of the selected lateral and longitudinal first and second strip-like transparent electrodes 3a and 3b which are formed in parallel in the lateral and longitudinal directions, respectively is set as one pixel. In other words, in the liquid crystal panel 2, pixels are arranged in a grid-like manner, the first and second strip-like transparent electrodes 3a and 3a are placed laterally and longitudinally with respect to the pixels which are arranged in a grid-like manner, and a voltage is applied while selecting required ones of the lateral and longitudinal first and second strip-like transparent electrodes 3a and 3a. As a result, the liquid crystals of the liquid crystal layers 8 (liquid crystal cell) of pixels at intersections of the selected lateral and longitudinal first and second strip-like transparent electrodes 3a and 3b are driven. Namely, the liquid crystal panel 2 has a simple matrix type electrode structure, and performs simple matrix driving (duty driving). In the case where the number of display pixels is large, the driving is time-division multiplex driving.

FIG. 4 is a view showing the arrangement structure of the polarizing plates of the vertically aligned liquid crystal display apparatus. In the first and second polarizing plates 9a and 9b, the first polarizing plate 9a has an absorption axis in the direction indicated by the arrow 9a', and the second polarizing plate 9b has an absorption axis in the direction indicated by the arrow 9b'. Namely, the first polarizing plate 9a and the second polarizing plate 9b are placed so that their absorption axes 9a' and 9b' are perpendicular to each other (crossed Nicols arrangement), and the display mode of the liquid crystal panel 2 is normally black.

FIG. 5 is a view illustrating driving of the vertically aligned liquid crystal display apparatus, (a) is a view of a non-driven state, and (b) is a view of a driven state. In the liquid crystal panel 2, in the non-driven state where a voltage is not applied between the first and second strip-like transparent electrodes 3a and 3b, as shown in FIG. 5(a), the molecular major axis directions of liquid crystal molecules 8a in the liquid crystal layer 8 (liquid crystal cell) sandwiched between the first and second strip-like transparent electrodes 3a and 3b are substantially entirely aligned in an optical axis which is perpendicular to the first and second transparent substrates 5a and 5b by the functions of the first and second alignment films 4a and 4b. In order to, for example, control the alignment direction, however, the alignment is performed while forming a small tilt (pre-tilt), and there is little change in the polarization state of light passing through here. Therefore, light (linearly polarized light) passing through the first polarizing plate 9a which is on the side of the backlight of the liquid crystal panel 2 is incident substantially as it is on the second polarizing plate 9b which is on the side of the display screen of the liquid crystal panel 2, and mostly blocked or absorbed thereby to form a dark display (black display).

By contrast, in the driven state where a voltage is applied between the first and second strip-like transparent electrodes 3a and 3b, as shown in FIG. 5(b), the liquid crystal molecules 8a in the liquid crystal layer 8 sandwiched between the first and second strip-like transparent electrodes 3a and 3b are aligned by their negative dielectric constant anisotropy in a direction substantially perpendicular to the electric field, i.e., substantially in parallel to the first and second transparent substrates 5a and 5b, and change the polarization state of light passing through here. Therefore, light passing through the first polarizing plate 9a which is on the side of the backlight of the liquid crystal panel 2 emits from the liquid crystal layer 8 while the polarization state is changed, and hence the polarization component of the transmission axis which is perpendicular to the absorption axis 9a' of the second polarizing plate 9b that is on the side of the display screen of the liquid crystal panel 2 is increased to form a bright display (white display).

Here, a DC current is harmful to a liquid crystal. When a DC current is continued to be applied to a liquid crystal, the liquid crystal material is deteriorated. In the used nematic liquid crystal (negative liquid crystal) having a negative dielectric constant anisotropy, alignment disturbances occur even at a relatively low voltage which is lower than a predetermined voltage, and therefore a pixel is driven by, for example, a signal leakage current to an adjacent pixel (this is called crosstalk), and the contrast is impaired. In the driving of the vertically aligned liquid crystal display apparatus 1, therefore, the applied signal is inverted at predetermined period in order to eliminate a DC component. In order to prevent crosstalk from occurring, furthermore, a predetermined OFF voltage that is equal to or lower than a critical voltage (threshold) at which the liquid crystal is driven is applied also to a non-selected pixel.

As described above, the vertically aligned liquid crystal display apparatus 1 includes: the first and second transparent substrates 5a and 5b which are opposed to each other to be placed through a predetermined gap; the first strip-like transparent electrodes 3a which are placed in parallel on the surface of the first transparent substrate 5a that is opposed to the second transparent substrate 5b, and the second strip-like transparent electrodes 3b which are placed in parallel in the direction perpendicular to the first strip-like transparent electrodes 3a, on the surface of the second transparent substrate 5b that is opposed to the first transparent substrate 5a; the liquid crystal layer 8 which is placed between the opposed surfaces of the first and second transparent substrates 5a and 5b, and which is configured by the liquid crystal having a negative dielectric constant anisotropy, the alignment of the liquid crystal molecules 8a being substantially perpendicular to the first and second transparent substrates 5a and 5b, and in which, when a voltage which is equal to or higher than the predetermined threshold voltage is applied between the first and second strip-like transparent electrodes 3a and 3b, the alignment of the liquid crystal molecules 8a is substantially in parallel to the first and second transparent substrates 5a and 5b; and the first polarizing plate 9a which is placed on the surface of the first transparent substrate 5a that is opposite to the surface opposed to the second transparent substrate 5b, and which has the absorption axis 9a' in the predetermined direction, and the second polarizing plate 9b which is placed on the surface of the second transparent substrate 5b that is opposite to the surface opposed to the first transparent substrate 5a, and which has the absorption axis 9b' in the direction perpendicular to the absorption axis 9a' of the first polarizing plate 9a, and performs simple matrix driving (duty driving).

FIG. 6 is a schematic sectional view of the vertically aligned liquid crystal display apparatus in which the structures of the alignment films, the spacer material, the seal, the liquid crystal layer, the polarizing plates, and the like are omitted, (a) is a view showing the shapes of the conventional first and second strip-like transparent electrodes, and (b) is a view showing an electric field which is produced by the OFF voltage that is applied between the conventional first and second transparent electrodes of (a). In the first and second strip-like transparent electrodes 3a and 3b which are used in the thus configured vertically aligned liquid crystal display apparatus 1, usually, as shown in FIG. 6(a), electrode end portions enclosed by the dotted lines are formed into a tapered shape with respect to the opposed surfaces of the first and second transparent substrates 5a and 5b, and the whole electrodes form trapezoidal shapes in which the opposed surfaces of the first and second strip-like transparent substrates 5a and 5b configure the bases, respectively.

In the first and second strip-like transparent electrodes 3a and 3b having a trapezoidal shape as described above, as shown by the solid arrows in FIG. 6(b), the electric field produced by the OFF voltage which is applied between the first and second strip-like transparent electrodes 3a and 3b is aligned substantially in parallel to the direction perpendicular to the first and second transparent substrates 5a and 5b in middle portions (pixel middle portion) of the first and second strip-like transparent electrodes 3a and 3b in a pixel, but, in end portions (pixel peripheral portion) of the first and second strip-like transparent electrodes 3a and 3b in a pixel, the electric field is not aligned substantially in parallel to the direction perpendicular to the first and second transparent substrates 5a and 5b, to be formed as an oblique electric field, and the alignment of the liquid crystal molecules 8a in a non-selected pixel is disturbed by the oblique electric field. As shown by the hollow arrows in FIG. 6(b), therefore, light leakage occurs in the periphery of a non-selected pixel, and the OFF transmittance is increased, whereby the contrast is lowered.

In order solve this, as disclosed in Patent Literature 1, for example, a technique is known in which a black mask is disposed on the surface of the second strip-like transparent substrate which is opposed to the first transparent substrate, and in a portion where the second transparent electrodes are not formed, the taper-shaped end portions of the second transparent electrodes are covered by the black mask, and light leakage in the periphery of a non-selected pixel is prevented from occurring, thereby improving the contrast.

PRIOR ART LITERATURE

Patent Literature

Patent Literature 1: Japanese Patent Application Laid-Open No. 5-2161

SUMMARY OF THE INVENTION

Problem to be Solved by the Invention

In the above-described conventional art, however, the taper-shaped end portions of the second transparent electrodes are covered by the black mask, and hence the area of each pixel contributing to the display is correspondingly reduced. Namely, there arises a problem in that the aperture ratio of each pixel is reduced and the display is darkened.

It is an object of the invention to provide a liquid crystal display apparatus and method of producing transparent electrodes in which light leakage from a peripheral portion of a non-selected pixel can be suppressed without reducing the aperture ratio of each pixel, and the contrast can be improved.

Means for Solving the Problem

In order to attain the object, the liquid crystal display apparatus of the invention is characterized in that the apparatus includes: first and second transparent substrates 5a and 5b which are opposed to each other to be placed through a predetermined gap; a liquid crystal layer 8 which is placed between opposed surfaces of the first and second transparent substrates 5a and 5b; first strip-like transparent electrodes 3a which are formed in a stripe-like pattern on the surface of the first transparent substrate 5a that is opposed to the second transparent substrate 5b; a transparent resin film 22 which is a transparent resin covering film that is formed after a stripe-like black mask 21 is formed in a direction perpendicular to the first strip-like transparent electrodes 3a, on the surface of the second transparent substrate 5b that is opposed to the first transparent substrate 5a, the resin film having inverted trapezoidal recessed portions 22a in a film surface corresponding to gaps of the black mask 21; and second strip-like transparent electrodes 30b which are formed in the recessed portions 22a of the resin film 22, and which have an inverted trapezoidal shape.

Furthermore, the method of producing transparent electrodes of the invention is a method of producing the second strip-like transparent electrodes 30b in the liquid crystal display apparatus of the invention, and characterized in that, after the stripe-like black mask 21 is formed in the direction perpendicular to the first strip-like transparent electrodes 3a, on the surface of the second transparent substrate 5b that is opposed to the first transparent substrate 5a, overcoating with a transparent resin is performed to form the transparent resin film 22 which has the inverted trapezoidal recessed portions 22a on the film surface corresponding to the gaps of the black mask 21, and the second strip-like transparent electrodes 30b are formed in the recessed portions 22a of the resin film 22, thereby obtaining the second strip-like transparent electrodes 30b which have an inverted trapezoidal shape.

Effects of the Invention

According to of the liquid crystal display apparatus and method of producing transparent electrodes of the invention, the second strip-like transparent electrodes, which are conventionally trapezoidal, are formed into an inverted trapezoidal shape, whereby generation of an oblique electric field in the periphery of a non-selected pixel can be suppressed, and disturbances which are due to the oblique electric field can be suppressed in the alignment of liquid crystal molecules in a non-selected pixel. Although the black mask is placed on the back sides of and between the second strip-like transparent electrodes, moreover, shaping of the second strip-like transparent electrodes into an inverted trapezoidal shape is realized. As a result, it is possible to provide a liquid crystal display apparatus and method of producing transparent electrodes in which, without reducing the aperture ratio of each pixel, light leakage from a peripheral portion of a non-selected pixel can be suppressed more surely by both the inverted trapezoidal second strip-like transparent electrodes and the black mask, and the contrast can be improved.

MODE FOR CARRYING OUT THE INVENTION

Figure 1:
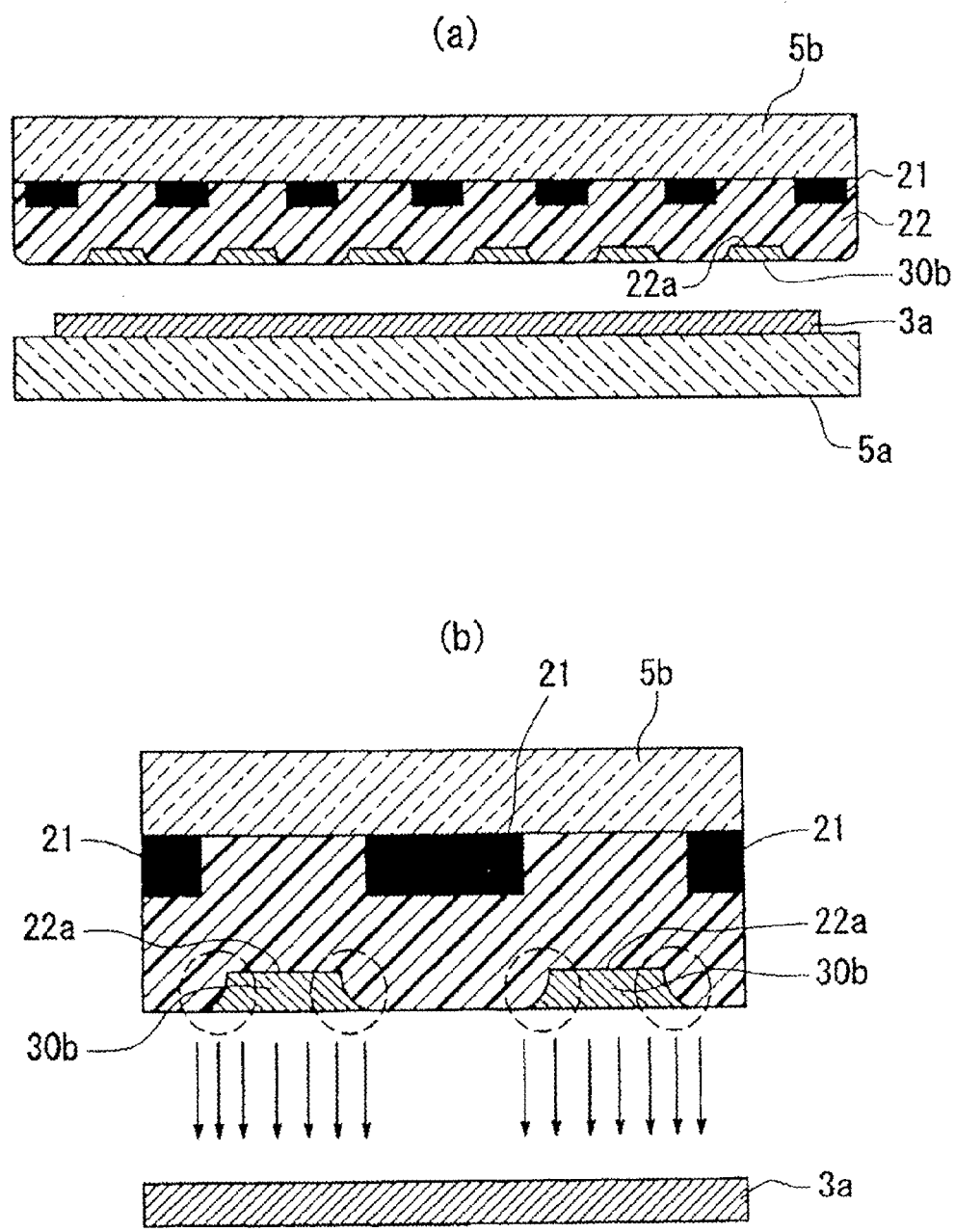
FIG. 1 is a schematic sectional view showing the liquid crystal display apparatus having a simple matrix type electrode structure according to the invention, (a) is a schematic section showing the shapes of first and second strip-like transparent electrodes, and (b) is a schematic sectional view showing an electric field which is produced by an OFF voltage that is applied between the first and second transparent electrodes of (a).
Figure 2:
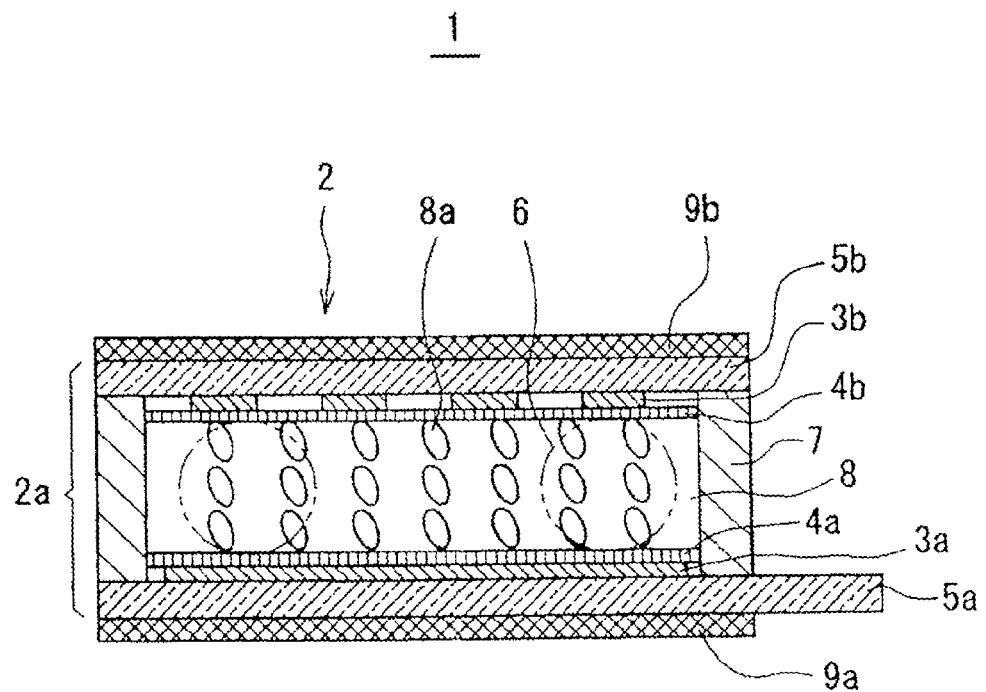
FIG. 2 is a sectional view of a vertically aligned liquid crystal display apparatus which is an example of a liquid crystal display apparatus having a simple matrix type electrode structure.
Figure 3:
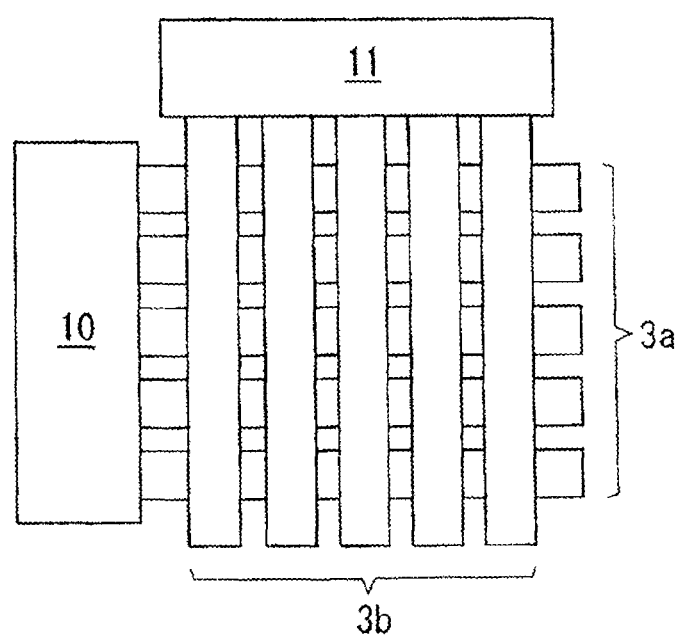
FIG. 3 is a view showing the simple matrix type electrode structure of the vertically aligned liquid crystal display apparatus of FIG. 2.
Figure 4:
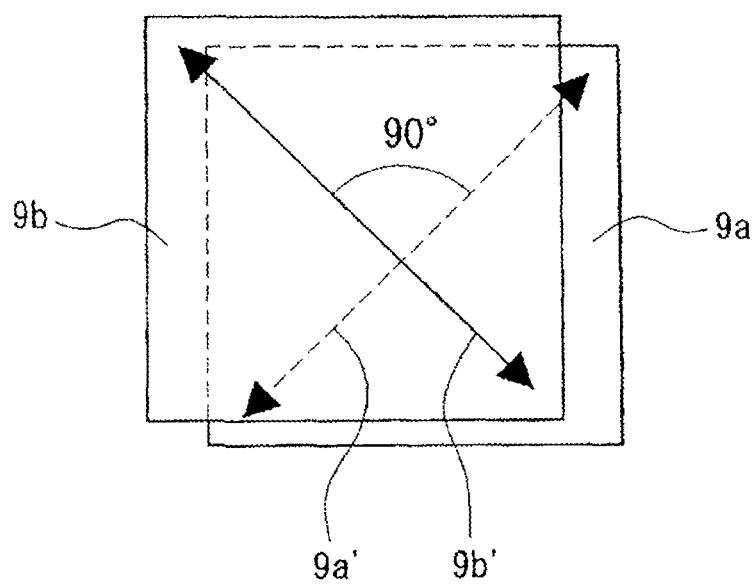
FIG. 4 is a view showing the arrangement structure of polarizing plates of the vertically aligned liquid crystal display apparatus of FIG. 2.
Figure 5A:
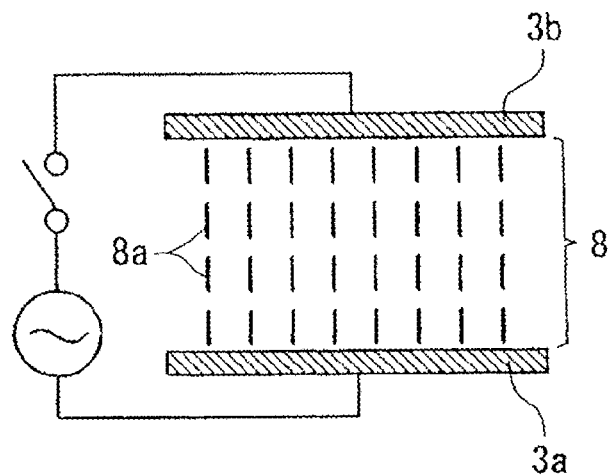
FIG. 5 is a view illustrating driving of the vertically aligned liquid crystal display apparatus of FIG. 2, (a) is a view of a non-driven state, and (b) is a view of a driven state.
Figure 5B:
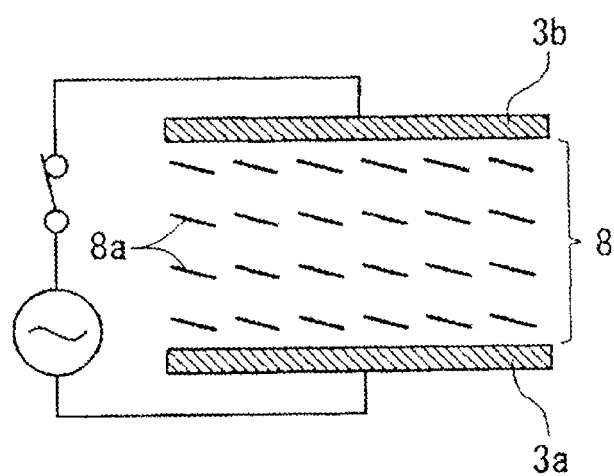
Figure 6A:
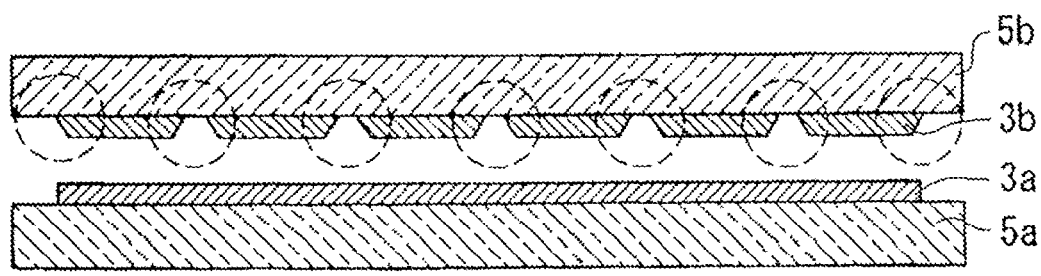
FIG. 6 is a schematic sectional view of the vertically aligned liquid crystal display apparatus of FIG. 2, (a) is a view showing the shapes of conventional first and second strip-like transparent electrodes, and (b) is a view showing an electric field which is produced by an OFF voltage that is applied between the conventional first and second transparent electrodes of (a).
Figure 6B:
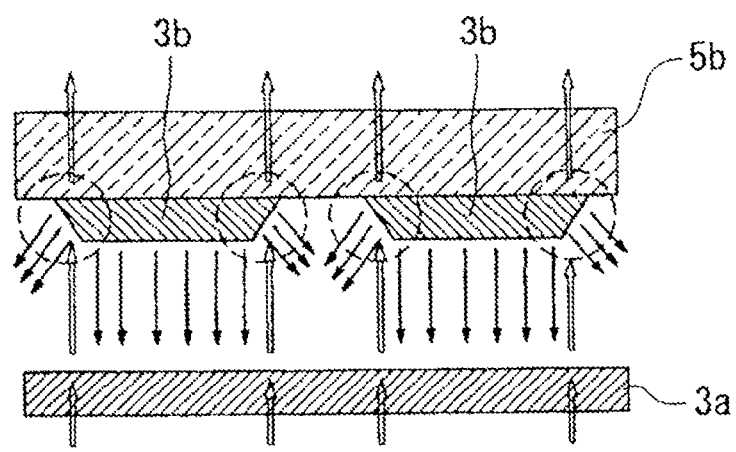

Hereinafter, an embodiment of the invention will be described with reference to FIG. 1. FIG. 1 is a schematic sectional view showing the liquid crystal display apparatus having a simple matrix type electrode structure according to the invention, (a) is a schematic section showing the shapes of first and second strip-like transparent electrodes, and (b) is a schematic sectional view showing an electric field which is produced by an OFF voltage that is applied between the first and second transparent electrodes of (a). The display apparatus shown in FIG. 1 is characterized in the structure of the second transparent electrodes, and a method of producing them, and the other structure is identical with the vertically aligned liquid crystal display apparatus shown in FIG. 4. Therefore, the identical structure portions are denoted by the same reference numerals, and their detailed description is omitted. In FIG. 1, the structures of the alignment films 4a, 4b, the spacer material 6, the seal 7, the liquid crystal layer 8, the polarizing plates 9a, 9b, and the like are omitted in the same manner as FIG. 6.

In the vertically aligned liquid crystal display apparatus 20 of the embodiment, as shown in FIG. 1(a), the transparent resin film 22 which is a transparent resin covering film that is formed after the stripe-like black mask 21 is formed in the direction perpendicular to the first strip-like transparent electrodes 3a, and which has inverted trapezoidal recessed portions 22a on the film surface corresponding to the gaps of the black mask 21 is formed on the surface of the second transparent substrate 5b that is opposed to the first transparent substrate 5a, and the second strip-like transparent electrodes 30b are formed in the recessed portions 22a of the resin film 22. Electrode end portions of the second strip-like transparent electrodes 30b extend along the shapes (inverted tapered shapes) of end portions of the recessed portions 22a, with the result that, unlike the conventional trapezoidal second strip-like transparent electrodes 3b, the second strip-like transparent electrodes 30b have an inverted trapezoidal shape. Since the plurality of second strip-like transparent electrodes 30b are formed in parallel to the direction perpendicular to the first strip-like transparent electrodes 3a, on the surface (the film surface of the resin film 22) of the second transparent substrate 5b that is opposed to the first transparent substrate 5a, the second strip-like transparent electrodes are formed as a whole into a stripe-like pattern.

The second alignment film 4b is formed on the film surface of the resin film 22 which is flattened by embedding the second strip-like transparent electrodes 30b into the recessed portions 22a.

An example of the method of producing the inverted trapezoidal second strip-like transparent electrodes 30b will be described. As a first step, first, the stripe-like black mask 21 is formed in the direction perpendicular to the first strip-like transparent electrodes 3a, on one substrate surface of the second transparent substrate 5b. For example, the black mask 21 is formed into a predetermined shape (stripe-like pattern) by applying a photosensitive black mask material at a predetermined thickness on one whole substrate surface of the second transparent substrate 5b, and thereafter performing a photo etching process.

As a second step, next, the surface of the second transparent substrate 5b that is opposed to the first transparent substrate 5a is overcoated with a transparent resin (coating material) at a predetermined thickness, thereby forming the transparent resin film 22 having the inverted trapezoidal recessed portions 22a, on a film surface corresponding to the gaps of the black mask 21. In order to form the recessed portions 22a, it is aimed that the thickness ratio between the black mask 21 and the resin film 22 is 1:2 to 1:5, and the depth of the recessed portions 22a is 0.1 to 0.5 μm.

As a third step, finally, the second strip-like transparent electrodes 30b are formed in the recessed portions 22a which are in the film surface of the resin film 22. The second strip-like transparent electrodes 30b are formed into a predetermined shape (stripe-like pattern) by forming a film on the whole film surface of the resin film 22 by vapor deposition or sputtering, and thereafter performing a photo etching process.

As described above, therefore, the electrode end portions of the second strip-like transparent electrodes 30b which are enclosed by the dotted lines extend along the shapes (inverted tapered shapes) of the end portions of the recessed portions 22a, with the result that, unlike the conventional trapezoidal second strip-like transparent electrodes 3b, the second strip-like transparent electrodes 30b have an inverted trapezoidal shape. Since the plurality of second strip-like transparent electrodes 30b are formed in parallel to the direction perpendicular to the first strip-like transparent electrodes 3a, on the surface (the film surface of the resin film 22) of the second transparent substrate 5b that is opposed to the first transparent substrate 5a, the second strip-like transparent electrodes are formed as a whole into a stripe-like pattern.

In the vertically aligned liquid crystal display apparatus 20 of the embodiment, therefore, the second strip-like transparent electrodes 3a, which are conventionally trapezoidal, are formed into an inverted trapezoidal shape, whereby the overall surfaces of the second strip-like transparent electrodes 30b on the side of the liquid crystal layer 8 are placed in a plane which is parallel to the first and second transparent substrates 5a and 5b, and, as shown by the solid arrows in FIG. 1(b), the electric field which is produced by the OFF voltage that is applied between the first and second strip-like transparent electrodes 3a and 30b is aligned substantially in parallel to the direction perpendicular to the first and second transparent substrates 5a and 5b, in both the middle portions (pixel middle portion) and end portions (pixel peripheral portion) of the first and second strip-like transparent electrodes 3a and 3b in a pixel.

Therefore, generation of an oblique electric field in the periphery of a non-selected pixel can be suppressed, and disturbances which are due to the oblique electric field can be suppressed in the alignment of the liquid crystal molecules 8a in a non-selected pixel. Although the black mask 21 is placed on the back sides of and between the second strip-like transparent electrodes 30b, moreover, shaping of the second strip-like transparent electrodes into an inverted trapezoidal shape is realized. As a result, it is possible to provide the liquid crystal display apparatus and method of producing transparent electrodes in which, without reducing the aperture ratio of each pixel, light leakage from a peripheral portion of a non-selected pixel can be suppressed more surely by both the inverted trapezoidal second strip-like transparent electrodes 30b and the black mask 31, and the contrast can be improved.

In the vertically aligned liquid crystal display apparatus 20 of the embodiment, the black mask, the resin film, and the inverted trapezoidal second strip-like transparent electrodes are formed on the front substrate which is on the side of the display screen. Alternatively, these may be formed on the rear substrate which is on the side of the backlight, or may be formed on both the front substrate and the rear substrate. The invention is not limited to the embodiment, and may be variously modified without departing from the spirit of the invention.

DESCRIPTION OF REFERENCE NUMERALS 1 vertically aligned liquid crystal display apparatus
3a first strip-like transparent electrode
30b second strip-like transparent electrode
5a first transparent substrate
5b second transparent substrate
8 liquid crystal layer
21 black mask
22 resin film
22a recessed portion

The invention claimed is:

1. A liquid crystal display apparatus comprising:
   first and second transparent substrates that are opposed to each other to be placed through a predetermined gap;
   a liquid crystal layer that is placed between opposed surfaces of said first and second transparent substrates;
   first strip-like transparent electrodes that are formed in a stripe-like pattern on a surface of said first transparent substrate that is opposed to said second transparent substrate;
   a stripe-like black mask that is formed in a direction perpendicular to said first strip-like transparent electrodes on a surface of said second transparent substrate that is opposed to said first transparent substrate;
   a transparent resin film that is a transparent resin covering film that is formed over the stripe-like black mask and said second transparent substrate, said resin film having inverted trapezoidal recessed portions in a film surface corresponding to gaps of said black mask wherein each of the inverted trapezoidal recessed portions has one pair of parallel sides and a longer side of the one pair of the parallel sides faces the first strip-like transparent electrodes; and
   one set of second strip-like transparent electrodes that is formed in said recessed portions of said resin film, each of the second strip-like transparent electrodes having an inverted trapezoidal shape having one pair of parallel sides such that a longer side of the one pair of the parallel sides of the inverted trapezoidal shape faces the first strip-like transparent electrodes.

2. The liquid crystal display apparatus according to claim 1, further comprising an alignment film formed on the film surface of the transparent resin film, wherein the transparent resin film is flat by the second strip-like electrodes being formed in the inverted trapezoidal recessed portions.

3. The liquid crystal display apparatus according to claim 1, wherein a thickness ratio between the black mask and the transparent resin film is between about 1:2 to 1:5, and a depth of the trapezoidal recessed portions is 0.1 to 0.5 μm.

4. The liquid crystal display apparatus according to claim 1, wherein the overall surfaces of the second strip-like transparent electrodes on the side of the liquid crystal layer are placed in a plane that is parallel to the first and second transparent substrates.

5. The liquid crystal display apparatus according to claim 4, wherein the electric field that is produced by the OFF voltage that is applied between the first and second strip-like transparent electrodes is aligned substantially in parallel to the direction perpendicular to the first and second transparent substrates, in both middle portions and end portions of the first and second strip-like transparent electrodes in a pixel.

6. The liquid crystal display apparatus of claim 1, wherein the electrode end portions of the second strip-like transparent electrodes extend along the inverted tapered shapes of end portions of the recessed portions.

7. A method of producing transparent electrodes in a liquid crystal display apparatus comprising the steps of:

forming a stripe-like black mask in a direction perpendicular to first strip-like transparent electrodes, on a surface of a second transparent substrate that is opposed to a first transparent substrate, overcoating with a transparent resin to form a transparent resin film that has inverted trapezoidal recessed portions on said film surface corresponding to gaps of said formed black mask, wherein each of the inverted trapezoidal recessed portions has one pair of parallel sides and a longer side of the one pair of the parallel sides faces the first strip-like transparent electrodes; and forming one set of second strip-like transparent electrodes in said recessed portions of said resin film, thereby obtaining said second strip-like transparent electrodes that have an inverted trapezoidal shape having one pair of parallel sides such that a longer side of the one pair of the parallel sides of the inverted trapezoidal shape faces the first strip-like transparent electrodes.

* * * * *